(12) United States Patent
Klein et al.

(10) Patent No.: US 7,018,453 B2
(45) Date of Patent: Mar. 28, 2006

(54) LOW VOC WEB OFFSET HEATSET INKS

(75) Inventors: David Klein, Wayne, NJ (US); Gary F. Dandreaux, Hackensack, NJ (US); Richard R. Durand, Jr., Woodridge, NJ (US); Thierry Frinault, Romford (GB); Kenneth Smith, Saylorsburg, PA (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 10/751,246

(22) Filed: Dec. 31, 2003

(65) Prior Publication Data

US 2005/0143489 A1 Jun. 30, 2005

(51) Int. Cl.
*C09D 11/02* (2006.01)
*C03C 17/00* (2006.01)

(52) U.S. Cl. .................... 106/31.4; 523/160; 523/161; 524/555; 524/556; 524/577

(58) Field of Classification Search ............... 106/31.4; 523/160, 161; 524/555, 556, 577

See application file for complete search history.

(56) References Cited

U.S. PATENT DOCUMENTS

| | | | | |
|---|---|---|---|---|
| 4,431,721 | A | | 2/1984 | Jost et al. ..................... 430/37 |
| 5,158,606 | A | * | 10/1992 | Carlick et al. ............... 524/145 |
| 5,545,741 | A | | 8/1996 | Szantay et al. .......... 546/276.7 |
| 5,594,048 | A | * | 1/1997 | Weder et al. ................ 523/335 |
| 5,849,833 | A | | 12/1998 | Puschak et al. ............. 524/521 |
| 5,968,243 | A | * | 10/1999 | Belmont et al. .......... 106/31.65 |
| 5,972,088 | A | * | 10/1999 | Krishnan et al. ......... 106/31.73 |
| 6,200,372 | B1 | * | 3/2001 | Krishnan et al. ......... 106/31.73 |
| 6,369,128 | B1 | * | 4/2002 | Hunt et al. .................. 523/161 |
| 6,488,756 | B1 | | 12/2002 | Schoen et al. ............... 106/415 |
| 6,765,040 | B1 | * | 7/2004 | Krishnan et al. ............ 523/160 |
| 2003/0134940 | A1 | | 7/2003 | Morrison et al. ............ 523/160 |
| 2004/0054068 | A1 | * | 3/2004 | Slone ......................... 524/556 |

FOREIGN PATENT DOCUMENTS

| | | |
|---|---|---|
| EP | 0 609 076 B1 | 8/1994 |
| EP | 0 731 150 B1 | 9/1996 |
| WO | WO 96/34922 | 11/1996 |

* cited by examiner

*Primary Examiner*—J. A. Lorengo
*Assistant Examiner*—Veronica F. Faison
(74) *Attorney, Agent, or Firm*—Sidney Persley

(57) ABSTRACT

A web offset heatset printing ink composition having less than about 2 wt. % of volatile organic compounds containing an aqueous polymer latex dispersed in an ink base of a resin, a non-volatile plasticizer, and a pigment and method for preparing same.

26 Claims, No Drawings

LOW VOC WEB OFFSET HEATSET INKS

FIELD OF THE INVENTION

The invention relates to a web offset heatset ink composition having less than 2% by weight of volatile organic compounds that dries at high speed and contains a latex polymer.

BACKGROUND OF THE INVENTION

Historically, lithographic web offset heatset inks contain between 30% and 45% volatile organic compounds (VOC). Besides being detrimental to the environment, VOCs are also flammable and hazardous to the printers who operate the press. Thus, it is desirable to reduce the VOC content in lithographic web offset heatset inks as much as possible. Initial attempts at solving this problem involved the use of chemical reactions that were triggered in a press oven. However, such oven cured ink systems did not have shelf stability.

Therefore, a heat setting web offset ink will typically contain the following major components (a) a high molecular weight ink resin to disperse the pigment and also to provide the toughness and gloss the ink requires on drying, (b) solvents to provide the fluidity to the ink before it is placed on the web and dried in an oven, (c) pigment, and (d) other minor components such as gellants, which provide structure to the ink, plasticizers (non volatile solvents), waxes, thickeners, and antioxidants. Conventional heatset inks set or dry by evaporation of the ink oil on heating at 250–300° F., and, to some degree, by penetration of the ink oil into the paper, leaving behind a hard polymeric film.

EP 731150 A1 960911 describes rapid thermosetting low VOC web offset lithographic ink systems comprising solid resin, drying oil alkyds, bodied drying oil, vegetable oil, fatty acids, multifunctional unsaturated polyester, reducing agents and transition metal salts of organic acids and may also include an aqueous fountain solution containing peroxides that promote free radical polymerization of the ink. WO96/34922, U.S. Pat. No. 5,431,721, and U.S. Pat. No. 5,545,741, 1996 respectively describe lithographic inks which employ non-volatile solvents, but they set by penetration of the non-volatile solvent into the stock.

Thus, there is still a need to formulate low VOC web offset heatset inks that have good shelf stability and high dry speed.

SUMMARY OF THE INVENTION

The present invention provides a web offset heatset ink composition having less than about 2 wt. % of VOC comprising an aqueous polymer latex dispersed in an ink base that includes:
  (a) an ink resin;
  (b) a non-volatile plasticizer; and
  (c) a pigment.

The present invention also provides a method for increasing drying or setting speed of a web offset heatset ink composition which has less than about 2 wt. % of VOC in which the ink contains the ink base described above and an aqueous polymer latex.

The present invention further provides a method of increasing shelf stability of a web offset heatset ink composition which has less than about 2 wt. % of VOC in which the ink contains the ink base described above and an aqueous polymer latex.

Other objects and advantages of the present invention will become apparent from the following description and appended claims.

DETAILED DESCRIPTION OF THE INVENTION

Low VOC (less than about 2% and preferably about 0% VOC) web offset heatset inks which print cleanly on conventional lithographic plates and dry at maximum press speeds of about 1000 ft/minute under typical printing conditions are described. The inks consist of a polymer latex dispersed in an ink base made up of ink resins, a non-volatile plasticizer, and pigment.

Ink Base

The ink base includes a high acid number resin as a binder for the pigments. The high acid number resin may have an acid number of about 20 to about 250 and a softening point of between 80 to 200° C. Suitable resins include, but are not limited to, phenolic, maleic, fumaric, pentaerythritol, hydrocarbon resins, and/or mixtures of these groups, rosin resins, rosin salts, tall oil resins, and mixtures thereof. It is preferred that the resin be a phenolic modified rosin ester. A variety of other conventional rosin resins can be used and are readily known to those of ordinary skill in the art.

The ink base also includes a non-volatile plasticizer. The plasticizer is selected from the group consisting of tall oil esters, rosin esters, and fatty acid esters. Other suitable plasticizers for use in the ink base, include, but are not limited to alkyds, polyesters, phthallate esters, tallate esters, and mixtures thereof. It is preferred that the non-volatile plasticizer be a tallate ester.

The ink base further includes pigments which include all of those conventionally used and any dye, pigment, filler, or the like, which can be bonded to the resin and permit the resultant resinated pigment to be dispersed, milled, mixed, blended, or dissolved in any conventional manner in forming the final ink composition. The pigment may be in the form of a water-based dispersion, flush, or dry grind. The pigment may be added to the lithographic printing ink composition in either dry powder, flush, presscake, or water based dispersion form.

Polymer Latex

The polymer latex employed in the present invention includes but is not limited to modified acrylics, modified methacrylics, modified styrenes, modified styrene methacrylics, vinyls and mixtures thereof. It is preferred that the polymer latex have an amine functionality, and more preferred that it be an amine functionalized acrylic:styrene copolymer latex.

The increase in stability of the ink composition is due to an acid functionalized protective colloid within the latex itself. It is preferred that the acid functionalized protective colloid be a styrene acrylic resin, such as JONCRYL® 679 manufactured by Johnson Polymer of Racine, Wis. The protective colloid prevents the latex particles from interacting with the rest of the ink base and the ink composition until it reaches the oven, thus affording shelf stability of the overall web offset heatset ink composition. The latex containing the protective colloid is termed a supported latex.

The ink composition minus the latex is a viscous oil, and as it is non volatile, it will not dry (or set) under heatsetting conditions. With the latex present, once the ink composition reaches the oven the water and ammonia within it evaporate and heat forces collapse of the glassy latex particles so that they may blend with the rest of the ink, giving rise to a hard film. The amine groups in the latex can react with acid groups (forming salts) in the high acid number resins upon collapse of the latex in the oven and give rise to an even tougher film. Accordingly, while not being bound by theory, the increase in setting speed is believed to be due to the attraction between the amine functional latex and the acid functional high acid number resins that occurs once the water and ammonia in the polymer latex have been driven off.

The web offset heatset ink may also include water to act as a rheology and/or surface energy modifier of the ink. The water may be an added component or be contributed by one of the other components of the composition such as residual water from a pigment flush, presscake or latex.

The web offset heatset ink may also include additives such as waxes and surfactants which are known in the art.

The web offset heatset printing ink compositions of the present invention are further illustrated by the following non-limiting examples in which all parts and percentages of components are by weight and based on the total weight of the composition, respectively, unless otherwise indicated.

COMPARISON EXAMPLE 1

A conventional web offset heatset ink was prepared was prepared from the components indicated below in Table 1 using the an acrylic/styrene latex that does not contain amine functionality.

TABLE 1

| Component | Wt. % |
|---|---|
| Pigment (Raven 760, Columbia Chemicals Company of Marietta, GA) | 10.5 |
| Resin (13.3 wt. % of RP-305, phenolic modified rosin ester, manufactured by Westvaco of Charleston, SC 13.2 wt. % of VSPR-75, a phenolic modified rosin ester manufactured by Akzo Nobel of Chicago, IL) | 26.5 |
| Plasticizer (2-ethyl hexyl tallate, Chemol, Greensboro, NC) | 34.7 |
| Polymer latex (Lucidene 612, an acrylic:styrene emulsion manufactured by Rohm & Haas of Philadelphia, PA) | 28.3 |
| TOTAL | 100.0 |

The resins and plasticizer were combined and heated with stirring until molten and homogeneous. The mixture was allowed to cool to room temperature and the pigment was dispersed in the cooled mixture and ground until it became smooth and well dispersed. To the ink base was added the polymer latex and mixed thoroughly.

The web offset heatset printing ink was measured for tack on a Go Technology Digital Inkometer, manufactured Go Technology Co. of Loveland, Ohio at a speed of 1200 rpm at 32° C. The viscosity of the conventional printing ink was also measured at 25° C. using an automated Duke Viscometer, manufactured by Duke Technology of Chapmansboro, Tenn. The conventional printing ink was then printed on a Rochester Institute of Technology's (R.I.T.s) Harris M-1000 web offset heatset press at speeds up to 1200 feet per minute (fpm), web exit temperature of 300° F., and with Rosos KSP 500 M-3 fountain solution (pH of 3.7 and conductivity of 1950 mhos.). The maximum web speed (the speed with which the web operates while still maintaining appropriate drying of the print), tack and viscosity are set forth in Table 2 below.

TABLE 2

| | |
|---|---|
| Tack | 12.1 gram-meters |
| Viscosity | 210 poise |
| Maximum web speed | 500 feet per minute |

EXAMPLE 2

An experimental acrylicstyrene latex polymer containing amine functionality and protective colloid was prepared from the components set forth in Table 3 below.

TABLE 3

| | Component | Grams |
|---|---|---|
| A | Deionized water | 457.1 |
| B | Ammonia (30%, aqueous) | 23.4 |
| C | Sodium lauryl sulfate (30% aqueous, RHODOPON UB manufactured by Rhodia, Inc. of Cranbury, NJ). | 3.0 |
| D | Polypropylene glycol (POLY G-D1200, manufactured by BASF of Mount Olive, NJ) | 9.9 |
| E | Resin (JONCRYL Resin 679, a styrene acrylic resin, Johnson Polymer Racine, WI) | 116.5 |
| F | Ammonium persulfate | 3.9 |
| G | Deionized water | 39.5 |
| H | Dimethylaminoethyl methacrylate | 74.0 |
| I | Styrene | 262.0 |
| J | 2-Ethylhexyl acrylate | 0.5 |
| K | Ammonium persulfate | 1.0 |
| L | Deionized water | 10.0 |
| | TOTAL | 1000.0 |

Ingredients A, B, C, and D were charged and heated to 88° C. When the temperature reached between 75 and 80° C., ingredient E was added over a 20–30 minute period and then the temperature was held for 50–60 minutes at 88° C. to dissolve ingredient E. Then, 50% of F & G ingredient mixture was added, followed by 10% of H, I, & J ingredient mixture.

Twenty minutes later, the remaining F & G ingredient mixture and H, I, & J ingredient mixture were added over a period of 1.5 hours and then the heat was maintained for an hour. Thereafter K & L ingredient mixture was added over a period of 20 minutes, and the temperature was held at 88° C. for 1 hour, then cooled to room temperature to discharge.

The resulting latex emulsion had a pH of 8.28 with solids averaging 46.6% after two readings. The Brookfield viscosity was measured at 154 cP (spindle 3, 60 rpm, 25° C.).

EXAMPLE 3

An experimental black web offset heatset printing ink was prepared from the components set forth in Table 4 below.

TABLE 4

| Component | Weight Percentage |
|---|---|
| Pigment (Raven 760, Columbian Chemicals Company of Marietta, GA) | 12.0 |
| Resin (11.5 wt. % of RP-305, phenolic modified rosin ester, manufactured by Westvaco of Charleston, SC; 11.5 wt. % of VSPR-75, a phenolic modified rosin ester manufactured by Akzo Nobel of Chicago, IL) | 23.0 |

TABLE 4-continued

| Component | Weight Percentage |
|---|---|
| Plasticizer (2-ethyl hexyl tallate, Chemol, Greensboro, NC) | 31.6 |
| Polymer Latex of Example 2 | 29.0 |
| Alkali Blue Flush (BASE of Mount Olive, NJ ) | 2.6 |
| Wax (microcrystalline wax compound, manufactured by Carroll Scientific of McCook, IL) | 1.4 |
| Polytetrafluoroethylene compound manufactured by Shamrock Technologies of Dayton, NJ) | 0.4 |
| TOTAL | 100.0 |

The resins and plasticizer were combined and heated with stirring until molten and homogeneous. The mixture was allowed to cool to room temperature and the pigment was dispersed in the cooled mixture and ground until it became smooth and well dispersed.

To the mixture was added alkali blue flush, wax and PTFE with stirring and mixed thoroughly. The polymer latex of Example 2 was added and mixed thoroughly to form the experimental black web offset heatset printing ink.

The experimental black web offset heatset printing ink using the polymer latex of Example 2 was measured for tack 32° C. on a Go Technology Digital Inkometer, manufactured Go Technology Co. by Loveland, Ohio, at a speed of 1200 rpm. The viscosity of the conventional printing ink was also measured using an automated Duke Viscometer at 32° C., manufactured by Duke Technology of Chapmansboro, Tenn. The printing ink was then printed on Rochester Institute of Technology's (R.I.T.s) Harris M-1000 web offset heatset press at speeds up to 1200 feet per minute (fpm), web exit temperature of 300° F., and with Anchor Premium MEXH IIS fountain solution (pH of 4.3 and conductivity of 1900 mhos.). The maximum web speed, tack and viscosity are set forth in Table 5 below.

TABLE 5

| Tack | 8.7 gram-meters |
|---|---|
| Viscosity | 80 poise |
| Maximum web speed | 1000 feet per minute |

EXAMPLE 4

An experimental cyan web offset heatset printing ink was prepared from the components set forth in Table 6 below.

TABLE 6

| Component | Wt. % |
|---|---|
| Pigment (Blue Pigment 15:3, manufactured by Sun Chemical Corporation of Ft. Lee, NJ) | 12.0 |
| Resin (12.1 wt. % of RP-305, phenolic modified rosin ester, manufactured by Westvaco of Charleston, SC; 12.1 wt. % of VSPR-75, a phenolic modified rosin ester manufactured by Akzo Nobel of Chicago, IL) | 24.2 |
| Plasticizer (2-ethyl hexyl tallate, Chemol, Greensboro, NC) | 32.5 |
| Polymer Latex of Example 2 | 29.0 |
| Wax (microcrystalline wax compound, manufactured by Carroll Scientific of McCook, IL) | 1.7 |

TABLE 6-continued

| Component | Wt. % |
|---|---|
| Polytetrafluoroethylene compound manufactured by Shamrock Technologies of Dayton, NJ) | 0.6 |
| TOTAL | 100.0 |

The resins and plasticizer were combined and heated with stirring until molten and homogeneous. The mixture was allowed to cool to room temperature and the pigment was dispersed in the cooled mixture and ground until it became smooth and well dispersed.

To the mixture wax and PTFE was added and mixed through stirring thoroughly. The polymer latex of Example 2 was added and mixed thoroughly to form the experimental cyan web offset heatset printing ink.

The experimental cyan web offset heatset printing ink using the polymer latex of Example 2 was measured for tack according to the method set forth in Example 3. The viscosity was measured using an automated Duke Viscometer at 25° C. The printing ink was then printed on a Rochester Institute of Technology's (R.I.T.s) Harris M-1000 web offset heatset press at speeds up to 1200 feet per minute (fpm), web exit temperature of 300° F., and with Anchor Premium MEXH IIS fountain solution (pH of 4.3 and conductivity of 1900 mhos.). The maximum web speed, tack and viscosity are set forth in Table 7 below.

TABLE 7

| Tack | 9.2 gram-meters |
|---|---|
| Viscosity | 130 poise |
| Maximum web speed | 1000 feet per minute |

EXAMPLE 5

An experimental magenta web offset heatset printing ink was prepared from the components set forth in Table 8 below.

TABLE 8

| Component | Wt. % |
|---|---|
| Pigment (Red Pigment 57:1, manufactured by Sun Chemical Corporation of Ft. Lee, NJ) | 10.2 |
| Resin (12.4 wt. % of RP-305, phenolic modified rosin ester, manufactured by Westvaco of Charleston, SC; 12.4 wt. % of VSPR-75, a phenolic modified rosin ester manufactured by Akzo Nobel of Chicago, IL) | 24.8 |
| Plasticizer (2-ethyl hexyl tallate, Chemol, Greensboro, NC) | 33.7 |
| Polymer Latex of Example 2 | 29.0 |
| Wax (microcrystalline wax compound, manufactured by Carroll Scientific of _ Wax (microcrystalline wax compound, manufactured by Carroll Scientific of McCook, IL) | 1.7 |
| Polytetrafluoroethylene compound manufactured by Shamrock Technologies of Dayton, NJ) | 0.6 |
| TOTAL | 100.0 |

The experimental magenta web offset heatset printing ink was prepared according to the method described in Example 4. The printing ink was tested according to the measurements set forth in Example 4. The maximum web speed, tack and viscosity are set forth in Table 9 below.

TABLE 9

| Tack | 10.1 gram-meters |
| --- | --- |
| Viscosity | 175 poise |
| Maximum web speed | 1600 feet per minute |

EXAMPLE 6

An experimental yellow web offset heatset printing ink was prepared from the components set forth in Table 10 below.

TABLE 10

| Component | Weight Percentage |
| --- | --- |
| Pigment (Yellow Pigment Y-12 manufactured by Sun Chemical Corporation of Ft. Lee, NJ) | 10.8 |
| Resin (12.2 wt. % of RP-305, phenolic modified rosin ester, manufactured by Westvaco of Charleston, SC; 12.2 wt. % of VSPR-75, a phenolic modified rosin ester manufactured by Akzo Nobel of Chicago, IL) | 24.4 |
| Plasticizer (2-ethyl hexyl tallate, Chemol, Greensboro, NC) | 33.5 |
| Polymer Latex of Example 2 | 29.0 |
| Wax (microcrystalline wax compound, manufactured by Carroll Scientific of McCook, IL) | 1.7 |
| Polytetrafluoroethylene compound manufactured by Shamrock Technologies of Dayton, NJ) | 0.6 |
| TOTAL | 100.0 |

The experimental yellow web offset heatset printing ink was prepared according to the method described in Example 4. The printing ink was tested according to the measurements set forth in Example 4. The maximum web speed, tack and viscosity are set forth in Table 11 below.

TABLE 11

| Tack | 9.7 gram-meters |
| --- | --- |
| Viscosity | 150 poise |
| Maximum web speed | 1000 feet per minute |

The invention has been described in terms of preferred embodiments thereof, but is more broadly applicable as will be understood by those skilled in the art. The scope of the invention is only limited by the following claims.

What is claimed is:

1. A web offset heatset ink composition having less than about 2 wt. % of volatile organic compounds comprising an aqueous polymer latex dispersed in an ink base that comprises:
   (a) a resin;
   (b) a non-volatile plasticizer selected from the group consisting of tallate esters; and
   (c) a pigment.
2. The ink composition of claim 1, wherein said polymer latex is acrylic styrene copolymer latex.
3. The ink composition of claim 1, wherein said polymer latex comprises a protective colloid which comprises acid functional groups.
4. The ink composition of claim 3, wherein said protective colloid is an acrylic styrene polymer.
5. The ink composition of claim 1 wherein said polymer latex has amine functional groups.
6. The ink composition of claim 1, wherein said resin has acid functional groups.
7. The ink composition of claim 5, wherein said resin is a high acid number resin.
8. The ink composition of claim 1, wherein said non-volatile plasticizer is ethylhexyl tallate.
9. The ink composition of claim 1 having about 1 wt. % volatile organic compounds.
10. A method for increasing drying or setting speed of a web offset heatset ink composition having less than about 2 wt. % of volatile organic compounds and which comprises:
    (a) a resin;
    (b) a non-volatile plasticizer selected from the group consisting of tallate esters; and
    (c) a pigment;
    said method comprising adding to said ink composition an aqueous polymer latex.
11. The ink of claim 10 wherein said polymer latex has amine functional groups.
12. The method of claim 10, wherein said polymer latex is acrylic styrene copolymer latex.
13. The method of claim 10, wherein said polymer latex comprises a protective colloid which comprises acid functional groups.
14. The method of claim 13, wherein said protective colloid is an acrylic styrene resin.
15. The method of claim 10, wherein said non-volatile plasticizer is ethylhexylatallate.
16. The method of claim 10, wherein said resin has acid functional groups.
17. The method of claim 10, wherein said resin is a high acid number resin.
18. The method of claim 10, wherein said ink composition conatins wt. % volatile organic compounds.
19. A method of increasing shelf stability of a Web Offset heatset ink composition which has less than about 2 percent by weight of volatile organic compounds (VOC) and which comprises:
    (a) an ink resin;
    (b) a non-volatile plasticizer selected from the group consisting of tallate esters; and
    (c) a pigment;
    said method comprising adding to said ink composition an aqueous polymer latex and a protective colloid which comprises acid functional groups.
20. The method of claim 19 wherein said polymer latex has amine functional groups.
21. The method of claim 19, wherein said polymer latex is acrylic styrene copolymer latex.
22. The method of claim 19, wherein protective colloid is an acrylic styrene resin.
23. The method of claim 19, wherein said non-volatile plasticizer is ethylhexyltallate.
24. The method of claim 19, wherein said resin comprises acid functional groups.
25. The method of claim 19, wherein said resin is a high acid number resin.
26. The method of claim 19, wherein said ink composition contains about 0 wt. % of volatile organic compounds.

* * * * *